United States Patent [19]
Garrabrant et al.

[11] Patent Number: 5,610,595
[45] Date of Patent: Mar. 11, 1997

[54] PACKET RADIO COMMUNICATION SYSTEM PROTOCOL

[75] Inventors: Gary W. Garrabrant, Bellevue; Jay C. Cho, Seattle; Joseph T. Savarese, Snohomish County, all of Wash.

[73] Assignee: Intermec Corporation, Everett, Wash.

[21] Appl. No.: 404,111

[22] Filed: Mar. 14, 1995

Related U.S. Application Data

[63] Continuation of Ser. No. 804,319, Dec. 9, 1991, abandoned.
[51] Int. Cl.$^6$ ..................................................... H04Q 1/00
[52] U.S. Cl. .............................. 340/825.52; 340/825.5; 370/394; 370/913; 371/33
[58] Field of Search .......................... 340/825.52, 825.53, 340/825.5; 370/60, 61, 94.1; 371/32, 33, 60

[56] References Cited

U.S. PATENT DOCUMENTS

| | | | |
|---|---|---|---|
| 4,060,220 | 12/1977 | Metcalfe | 370/60 |
| 4,284,976 | 8/1981 | Gable | 340/825.53 |
| 4,703,475 | 10/1987 | Dretzka | 370/60 |
| 5,151,899 | 9/1992 | Thomas | 370/94.1 |

OTHER PUBLICATIONS

Fox, Terry L., "AX.25 Amateur Packet–Radio Link–Layer Protocol," Version 2.0, American Radio Relay League, Inc., Oct. 1984.

International Organization for Standardization, International Standard 4335, "Data communication—High–level data link control procedures—Consolidation of elements of procedures," Second edition—1984, Dec. 15.

*Primary Examiner*—Brian Zimmerman
*Attorney, Agent, or Firm*—Seed and Berry LLP

[57] ABSTRACT

A method and apparatus for transmitting data in a packet radio communication system having data sources, destinations and intermediate repeaters. According to a packet protocol, a repeat count in the protocol is decremented each time a packet is retransmitted, until the repeat count reaches zero, at which time the packet is discarded. According to another packet protocol, a sequence index is used to prevent duplicate packets from being received by requiring that the sequence number fall within a sequence number window at each device, which is incremented each time a packet is received. The sequence number is also used to cause the retransmission of packets which are lost, at which time the sequence number windows in the devices which are affected are reset to allow transmission of the lost packet.

13 Claims, 9 Drawing Sheets

| EVENT # | PCKT ORGN | mA | | | RPT1 | | | RFNC | | |
|---|---|---|---|---|---|---|---|---|---|---|
| | | SEQ. | REPT. | CONT. | WINDOW | SEQ. | REPT. | CONT. | WINDOW | SEQ. | REPT. | CONT. | WINDOW |
| 1 | mA | 19 | 1 | SABM | 20-03 | | | | | 0 | 1 | | 00-15 |
| | | 20 | | | 20-03 | | | | | 0 | | | 00-15 |
| 2 | RPT1 | 20 | | | | 19 | 0 | SABM | | | | | |
| | | 20 | | | | 20 | | | | | | | |
| 3 | mA | 03 | 1 | SABM | | | | | | 04 | | | 04-19 |
| | | 04 | | | 04-19 | | | | | | | | |
| 4 | RPT1 | 04 | | | 04-19 | 03 | 0 | SABM | | 04 | | | 04-19 |
| | | 04 | | | 04-19 | 04 | | | | | | | |
| 5 | RFNC | 04 | | | 04-19 | 04 | 1 | | | 04 | 1 | UA | 04-19 |
| | | 05 | | | 05-20 | 04 | 1 | | | 05 | | | 05-20 |
| 6 | | | | | | 04 | 1 | UA | | | | | |

Fig. 10

5.B
A DEVICE LOCATED SAME
DISTANCE FROM BRU
AS REPEATERS.

5.B
LOCATION OF DEVICE
IN FIELD OF MUTUAL
REPEATER COVERAGE

PACKET RADIO COMMUNICATION SYSTEM PROTOCOL

CROSS-REFERENCE TO RELATED APPLICATION

This application is a continuation of U.S. patent application Ser. No. 07/804,319, filed Dec. 9, 1991, now abandoned.

TECHNICAL FIELD

The present invention relates to communication systems, and more particularly to a method and apparatus for controlling a packet radio communication system.

BACKGROUND OF THE INVENTION

Radio communication systems which transmit information between locations have recently been used in bar code-based information systems. Information systems that are based on bar codes typically include a base computer which serves as a storage location for information and as a source of commands which control the other components of the system. These information systems also include bar code readers which are used to collect bar code-based information and other components which cause the information and commands to be communicated between the base computer and the bar code readers. Typical applications for bar code-based information systems are in inventory management and retail sales.

In many bar code-based information systems, it is advantageous for the bar code readers to be mobile. In the past, this has been accomplished by providing the bar code readers with local memory and powering the readers by batteries. In operation, a mobile bar code reader of this type are used to collect information from bar codes, store this information in its memory and then physically connect the bar code reader to a hard-wired communication system which reads the bar code reader's memory and transmits the stored information to the base computer. This mode of operation is both time-consuming and inconvenient. It also prevents the immediate transmission of the information to the base computer.

One solution of this problem is to connect the mobile bar code readers to the base computer through a radio link. A particularly advantageous type of radio link is provided by a spread spectrum communication system, which allows reliable communication of information in an electromagnetically noisy environment without high radio frequency (RF) power levels. A spread spectrum communication system is highly resistant to interference from other such systems, and allows transmission into areas which are not along a line-of-sight. Spread spectrum communication systems have been described by R. A. Scholtz in "The Origins of Spread Spectrum Communications," IEEE Trans. Comm., vol . COM-30, May 1982, pp. 822–854. One very useful form of spread spectrum communication system is based on the asynchronous transmission of "packets" of information between a source and a destination. In a bar code information system, a bar code reader and the base computer can serve as either a source or a destination. If two-way communications are necessary between a bar code reader and the base computer, each unit will be both a source and a destination.

A packet radio communication system allows communication between each bar code reader and the base computer essentially whenever such communication is needed. After a communication link has been established between the bar code reader and the base computer, the information to be communicated is broken into small portions. These relatively small portions of information are sent from the source to the destination in discrete messages. One advantage of breaking the information into discrete messages is that, if one of the discrete messages is not received correctly, the destination can request a retransmission of that message without having to request a retransmission of more.

The form of the discrete messages is a string of digital information, called a "frame." The information in the frame is arranged in a sequence of "fields." The contents of each field in a frame is established by a protocol, such as those prescribed in packet radio standards X.25, AX.25 and ALOHANET, for example. The X.25 standard is described in ISO document 4335—"Data Communication—High level data link control procedures. Consolidation of elements of procedures," second edition 1984. ALOHANET is described by Norman Abramson, in "Development of the ALOHANET," IEEE Trans. on Info. Theory, Vol. IT-31, No. 2, March 1985.

Low power communication systems such as spread spectrum packet radio systems have only a limited range. Typically transmitters with output powers of one Watt have a range no greater than 500 feet. Accordingly, it is possible for a mobile bar code reader to move beyond a range where the base computer and the mobile bar code reader can communicate reliably. In situations where this occurs, it has been found that one or more repeaters can be placed between the bar code reader and the base computer. These repeaters receive the information transmitted by the source and retransmit the information to the destination. In situations where longer range packet radio communications are desirable, one or more repeaters can form a transmission path between the source and destination. One example of such a situation is where a mobile bar code reader is used in a very large warehouse for inventory control purposes.

If a packet radio communication system uses a repeater, it is possible for a message transmitted by the repeater to be received by both the source and the destination. It is therefore necessary to provide some means for the packet to be identified. In the protocols mentioned above, packet identification includes addresses for the source and destination. Therefore, it is possible for a source to ignore a message which is repeated back to the source by recognizing that it was the source for the repeated message.

The addition of repeaters to a packet radio communication system introduces further complications. If more than one repeater can receive a message transmitted by a source, more than one repeater will repeat the message. If the destination is within range of the multiple repeaters, it must be capable of determining that it has received more than one copy of the same message and ignoring all but one copy. Further, it is possible for a message which has already been received by one repeater to receive that same message subsequently from another repeater. It is therefore advantageous to provide a protocol which will reduce the unnecessary repetition of messages in a packet radio communication system.

There is a finite possibility that messages can be lost in a packet radio communication system. Packet radio communications generally provide for confirmation of receipt of messages. In many systems, if a message is received incorrectly, the message is regarded as lost and retransmitted. This requires that the retransmitted message must be properly identified. It is therefore desirable to provide a protocol which will allow a lost message to be identified and a corresponding retransmitted message to be correctly placed in proper sequence in the information transmitted between the source and destination.

SUMMARY OF THE INVENTION

In one aspect, the present invention is a method for controlling a packet communication system, the communication system including a source station, a destination station and one or more repeater stations adapted to repeat messages from the source station to the destination station. The method comprises the steps, at the source station, of (a) composing a message, the message including: (1) an address code of the destination station, (2) an address code of the source station, and (3) a sequence index indicating the sequence in which the message was composed at the source station; (b) storing the sequence index; and transmitting the message.

In another aspect, the present invention is a method for controlling a packet communication system including a source station and a destination station. Each station has a unique address code, and the packet communication system is adapted to transmit messages from the source station to the destination station. The method comprises the steps of: at the source station: (a) composing a message, the message including: (1) the address code of the destination station, (2) the address code of the source station, and (3) a repeat count representative of a desired number of times the message is to be repeated by the system, and (4) a sequence index indicating the sequence in which the message was composed at the source station; and transmitting the message.

In a further aspect the invention is an apparatus for controlling a packet communication system including a source station, a destination station and one or more repeater stations adapted to repeat messages from the source station to the destination station. The apparatus comprises, at the source station: electronic circuitry composing a message, the message including: (1) an address code of the destination station, (2) an address code of the source station, and (3) a sequence index indicating the sequence in which the message was composed at the source station. The apparatus further includes a memory storing the sequence index; and a transmitter transmitting the message.

DETAILED DESCRIPTION OF THE INVENTION

Figure 1:
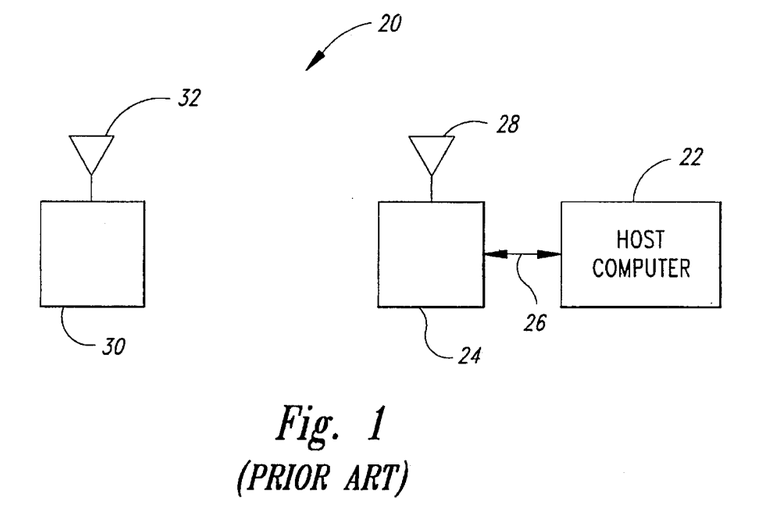
FIG. 1 is a schematic diagram of a radio communication system known in the prior art.

A schematic diagram of a radio communication system known in the prior art is shown in FIG. 1. The radio communication system 20 includes a host (or base) computer 22 which communicates with a base radio unit (BRU) 24 through a link 26. Typically the link 26 is an electrical cable. The BRU 24 includes an antenna 28 for transmitting and receiving radio frequency (RF) electromagnetic signals. The radio communication system 20 also includes a remote unit 30, such as a mobile bar code reader, which is separated from the BRU 24. The remote unit 30 includes an antenna 32, which is also for transmitting and receiving radio frequency (RF) signals. The BRU 24 and the remote unit 30 include conventional electronic circuitry which permits them to communicate through the means of transmitted RF energy.

Figure 2:
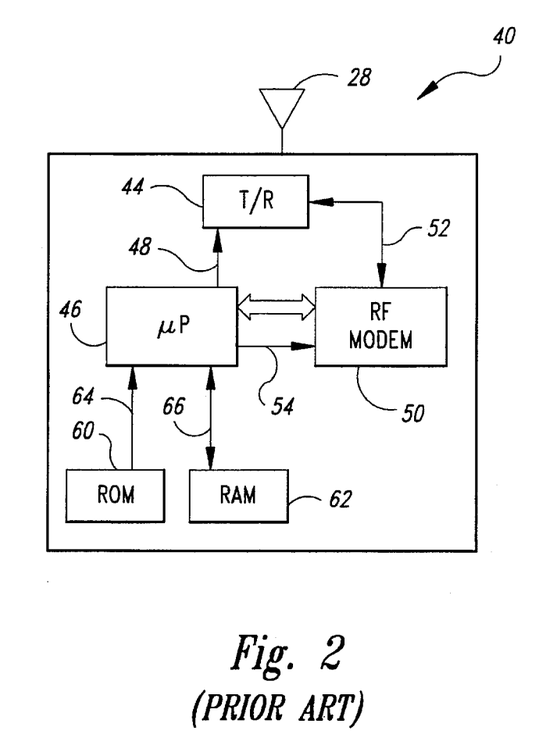
FIG. 2 is a schematic diagram of a packet radio transmitter/receiver unit known in the prior art.

A schematic block diagram of a packet radio transmitter/receiver unit 40 known in the prior art is shown in FIG. 2. The packet radio transmitter/receiver unit 40 (which could be either the BRU 24 or the remote unit 30 shown in FIG. 1) includes an antenna 42 (corresponding to the antennas 28 or 32 in FIG. 1) for transmitting and receiving RF energy. The antenna 42 is connected to a transmit/receive (TR) switch 44 which is operated according to control signals produced in a microprocessor 46 and transmitted to the TR switch 44 through a line 48. The TR switch 48 is placed in a receive mode if the transmitter/receiver unit 40 is transmitting receive RF energy through the antenna 42. The TR switch 44 is placed in a transmit mode if the transmitter/receiver unit 40 is expecting to transmit RF energy through the antenna 42. One form of the packet radio transmitter/receiver unit 40 is a 121 kb/s spread spectrum Proxim RXA-1000.

When it is desired that the transmitter/receiver unit 40 be prepared to receive messages, the TR switch 44 is placed in the receive mode with any RF energy it receives being transmitted to an RF modulator/demodulator (modem) 50 through a bidirectional line 52. The modem 50 is controlled by the microprocessor 46 through a control line 54. In the receive mode, the modem 50 demodulates the RF energy received by the antenna 42 to produce a digital signal which is sent to the microprocessor 46 through a bidirectional bus 56.

When it is desired that the transmitter/receiver unit 40 transmit one or more messages, the TR switch 44 is placed in the transmit mode. The microprocessor 46 determines the digital message to be sent and transmits the message to the modem 50 over the bidirectional bus 56. Upon receipt of an appropriate control signal over the control line 54 from the microprocessor 46, the modem 50 modulates an RF carrier. The modulated RF carrier is transmitted through the TR switch 44 to the antenna 42.

If the radio communication system is a spread spectrum system, modulation and demodulation of RF signals is generally chosen to be of one of two forms: direct sequence spread spectrum and frequency hopping spread spectrum. These two forms are described in "Spread Spectrum for Personal Communications," Microwave Journal, September 1991 and other standard reference texts cited therein. Further details are presented in the 1990 ARRL Handbook (especially Chapter 19), published by American Radio Relay League, Newington, Conn., which is hereby incorporated by reference.

The microprocessor 46 is programmed according to a program which is stored in a read-only memory (ROM) 60. The program stored in the ROM 60 is transmitted from the ROM 60 to a random-access memory (RAM) 62 through a data line 64 and a bidirectional data line 66. The conventional program in the RAM 62 causes the microprocessor 46 to issue control signals, interpret digital messages received through the antenna 42 and prepare digital messages for transmission through the antenna 42.

The program under which the microprocessor 46 operates is dependent upon the protocol under which the communication system 20 (see FIG. 1) operates. The protocol (for example, AX.25, described in "AX.25 Amateur Packet-Radio Link-Layer Protocol," published by the American Radio Relay League, Inc., Newington, Conn., which is incorporated herein by reference) assigns an address to every transmitter/receiver unit in the communication system. It also defines controls, which are used to control the flow of information in the communication system.

Figure 3:
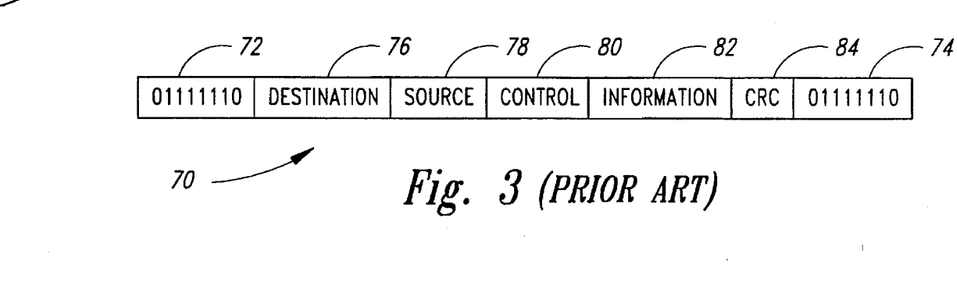
FIG. 3 is diagram of the format of a frame defined in a protocol known in the prior art.

A diagram of the format of a frame 70 defined in a protocol known in the prior art is shown in FIG. 3. The frame 70 includes binary information organized into several fields. These include flag fields 72 and 74, destination and source address fields 76 and 78, a control field 80, an information field 82, and a cyclic redundancy check (CRC) field 84. The flag fields 72 and 74, respectively, define the beginning and end of the frame 70 by a characteristic 8-bit binary sequence ("01111110") which cannot appear elsewhere within the frame 70. The destination and source address fields 76 and 78 are each one byte in length and respectively include the addresses of the destination and the source of a message. The control field 80 is also one byte in length and includes a binary number that corresponds to a control function associated with the frame. The control function can be either a command or a response. The information field 82 can have as many as 256 bytes of binary information. The CRC field 84 is a 16-bit number that is calculated based on the binary data in the other portions of the frame 70, according to a cyclic redundancy check algorithm published by the ISO, in document ISO 3309 (which defines the high level data link control procedures, HDLC). When the frame 70 is received at the destination, the algorithm is again performed on the data in the frame and the resulting number compared with that transmitted with the packet. If they are the same, it is assumed that the data in the frame are correct.

There are several commands and responses which may appear in the control field 80. The commands are shown in the following table:

| Command | Purpose |
| --- | --- |
| SABM | Establish Link Connection |
| DISC | Remove Link Connection |
| STTM | Topology Test |
| TEST | Diagnostics |
| UI | Group Broadcast |
| I | Exchange Information |
| RR | Flow |
| RNR | Control |
| XID | Channel Searching |

The responses are shown in the following table:

| Response | Purpose |
| --- | --- |
| UA | Acknowledge Commands |
| DM | Indicate Disconnected |
| TEST | Return Diagnostics |
| I | Exchange Information |
| RR | Flow |
| RNR | Control |
| UI | Group Broadcast |
| XID | Channel Searching |

The corresponding commands and responses are given in the following table:

| Command | Response |
| --- | --- |
| SABM | UA |
| DISC | DM |
| STTM | TEST |
| TEST | |
| UI | |
| I | I |
| RR | RR |
| RNR | RNR |
| XID | XID |

In the present invention, the commands supported are: SABM, DISC, TEST, I, RR and XID, while the responses suggested are UM, DM, TEST, I, RR and XID.

Figure 4:
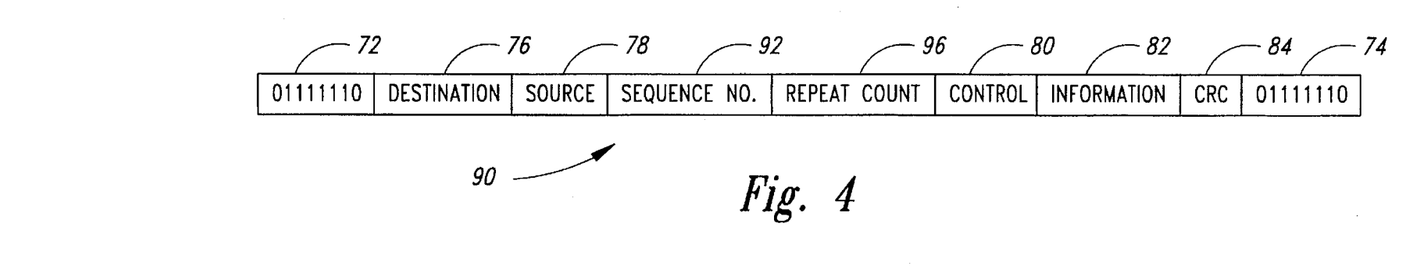
FIG. 4 is diagram of the format of a frame defined according to the protocol of the present invention.

A diagram of the format of a frame 90 defined according to the protocol of the present invention is shown in FIG. 4. This protocol is a custom protocol having features from two similar protocols: the AX.25 Amateur Packet Radio Link Layer protocol and the HDLC protocol. Most of the fields of the frame 90 according to the protocol of the present invention are identical to those known in the prior art. They are given the same reference numbers as used for the corresponding features in FIG. 3. The two new fields in the frame 90 are the 5-bit sequence number field 92 and the 3-bit repeat count field 96. The sequence number field 92 records the sequence in which the source of the message represented by the frame 92 is originally produced. The sequence number (or count, or index) is used to prevent duplicate packets. The repeat count field 96 represents the number of remaining times which the message represented by the frame 94 will be repeated before being discarded. It is used to prevent packets from being repeated between one or more repeaters forever. This feature will be further explained below.

The units of the packet radio communication system of the present invention can attain two additional states, beyond those known in the above-referenced protocols: the Fail state and the Search state. The Fail state supports sequence numbers. The sequence numbering scheme is similar to that used in ARPANET to support broadcast messages. It is necessary to eliminate multiple packet arrival which becomes possible with repeaters. The Fail state resynchronizes the sequence numbers in the case of lost synchronization. In this state, increasing retransmission timeout intervals also prevents one device in the communication system from swamping the network with packets by eliminating or controlling a hidden terminal problem.

The Search state supports the ability of a radio frequency network controller (RFNC) to move between different frequencies. This is accomplished by broadcasting an XID (exchange ID) command. In response, the RFNC will respond to the device sending the XID command, informing the device of the correct frequency and address to use. After this is accomplished, the device next enters the Fail state to resynchronize sequence numbers.

Figure 5:
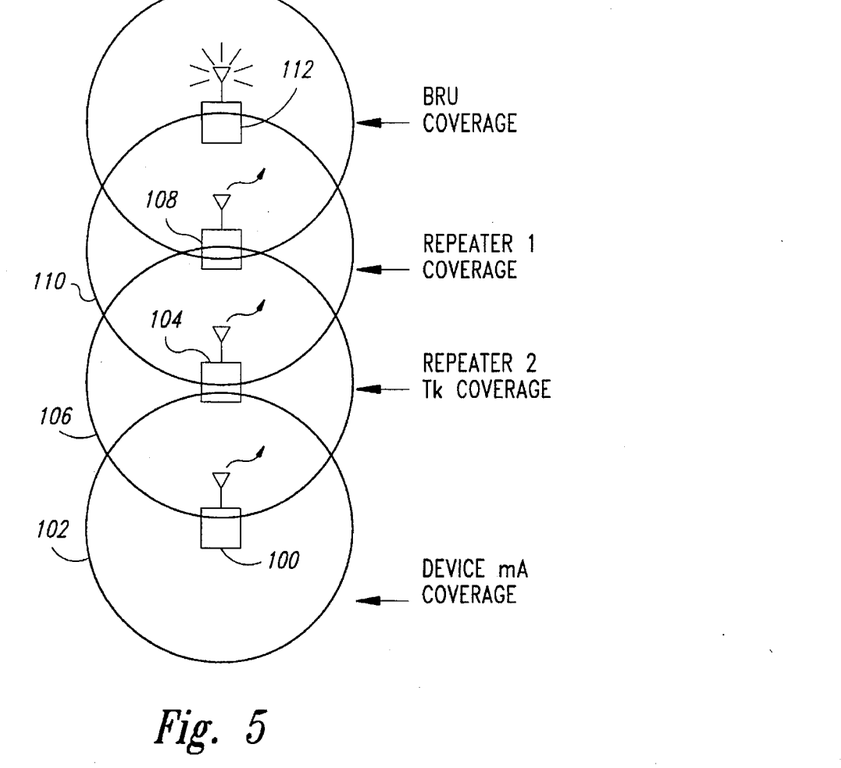
FIG. 5 is a schematic diagram of the transmission of a message from a source to a destination through two repeaters having overlapping antenna coverage patterns.

A schematic diagram of the transmission of a message from a mobile source 100 to a destination BRU 112 through first and second repeaters 104 and 108 having overlapping antenna coverage patterns is shown in FIG. 5. According to the present protocol, as many as six repeaters (giving seven hops) are allowed. The source 100 transmits a message with an antenna pattern schematically represented by the antenna coverage circle 102. It will be understood that the actual antenna coverage pattern is a complex function of the terrain and antenna placement, among other variables. In the present preferred embodiment, the radio network is accessed using a pure ALOHA standard, according to which devices simply transmit whenever they have something to send. If an acknowledgment is not received back, they retransmit, up to a predetermined number, until the transmission is acknowledged. The first repeater 104 is located within the antenna coverage circle 102 of the mobile source 100. Therefore, the first repeater 104 receives signals transmitted by the mobile source 100. The first repeater 104 transmits signals according to the antenna pattern schematically represented by the antenna coverage circle 106. The second repeater 108 is located within the antenna coverage circle 106. Therefore, the second repeater 108 receives signals transmitted by the first repeater 104. The second repeater 108 transmits signals according to the antenna pattern schematically represented by the antenna coverage circle 110. The BRU 112 is located within the antenna coverage circle 110. Therefore, the BRU 112 receives signals transmitted by the second repeater 108.

The antenna coverage circle 102 of the mobile source does not extend to the second repeater 108. Therefore, there is only a small probability that the second repeater 108 can receive signals directly from the mobile source 100 when at the positions shown in FIG. 5. Likewise, the antenna coverage circle 106 of the first repeater 104 does not extend to the BRU 112. Therefore, there is only a small probability that the BRU 112 can receive signals directly from the first repeater 104. Accordingly, signals that are transmitted from the source 100 to the BRU 112 are, with a high probability, sequentially relayed through the first and second repeaters 104 and 108, respectively. This represents a straightforward situation where the route of a message from a source (the source 100) to a destination (the BRU 112) is easily analyzed. Those skilled in the art will recognize that FIG. 5 also implies that transmissions from the BRU 112 to the source 100 will be relayed back through the first and second repeaters 104 and 108. It should be noted that the repeaters 104 and 108 can be stationary, or themselves mobile.

Figure 6:
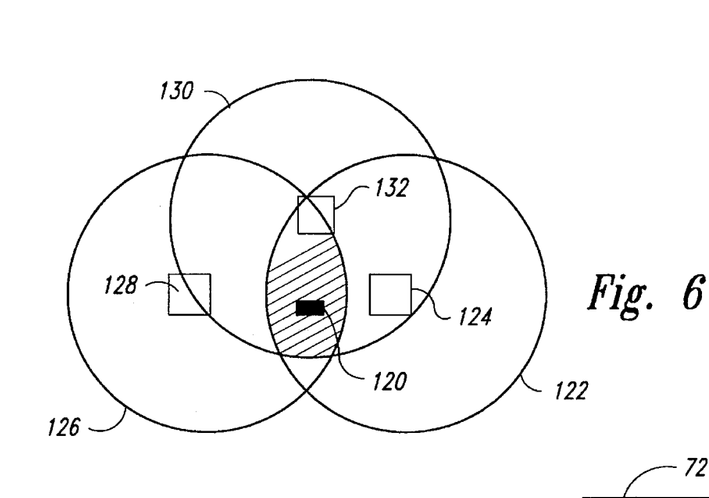
FIG. 6 is a schematic diagram of a configuration of source, destination and repeaters which may produce duplicate messages.

A schematic diagram of a configuration of sources, destination and repeaters which may produce duplicate messages is shown in FIG. 6. In this case, a mobile source 120 is located within an antenna coverage circle 122 for a first repeater 124, an antenna coverage circle 126 for a second repeater 128 and an antenna coverage circle 130 for a BRU 132. Accordingly, the BRU 132, the first repeater 124 and the second repeater 128 all receive the messages transmitted by the mobile source 120. Similarly, the first repeater 124 and the second repeater 128 are located within the antenna coverage circle 130 for the BRU 132. Therefore, the BRU 132 receives the messages subsequently transmitted by both the first repeater 124 and the second repeater 128, causing duplicate message packets. FIG. 6 represents the case where, without further means for distinguishing the three messages received by the BRU 132, the BRU 132 can equally well receive messages through three paths. One path is directly from the mobile source 120 to the BRU 132. Another path is through the first repeater 124 to the BRU 132, and the third path is from the second repeater 128 to the BRU 132. As in FIG. 5 above, those skilled in the art will recognize that FIG. 6 also means that transmissions from the BRU 132 to the mobile source 120 can be transmitted directly and also relayed through the first and second repeaters 124 and 128.

The situation shown in FIG. 5 does not require further information to determine the transmission path (given the necessary information concerning the relative positions of the mobile source 100 and repeaters 104 and 108 to the BRU 112). However, the situation shown in FIG. 6 does. The geometry shown in FIG. 6 also allows for other possible transmission paths between the mobile source 120 and the BRU 132. One simple path is that from the mobile source 120, through the first repeater 124, to the second repeater 128, back to the first repeater 124, and then to the BRU 132. These multiple paths mean that, without further constraints on the transmission scheme, the BRU 132 will receive multiple copies of any message transmitted from the mobile source 120 to the BRU 132.

The frame format shown in FIG. 4 contains information which can be used to reject all copies of any given messages transmitted from the mobile source 120 to the BRU 132, except the first message received by the BRU 132. This information is the repeat count field 96, shown in FIG. 4. The repeat count field 96 in the frame 90 for the message which is transmitted by the mobile source 120 is set to a predetermined number, representing the number of times which the message can be repeated before it is discarded by the radio packet communication system. Each time that the message is repeated by a repeater, the repeat count field 96 of the message is decremented by one before being transmitted. When a repeater receives a message having a frame 90 in which the repeat count field 96 has been decremented to zero, the repeater will not transmit the frame corresponding to the message. To accommodate the additional delays caused by repeaters, each device will calculate the required acknowledgment delay based on the number of repeaters set in the repeat count field 96. Forty milliseconds is added for each repeater, in the present embodiment.

Another Fail mode for the packet radio communication system of the present invention is the generation of duplicate packets. This is shown in FIG. 6, where the message packet can be received through several links. One is the direct link from the mobile source 120 to the BRU 132. Two others are the once-relayed links from the mobile source 120 to the BRU 132 through the first repeater 124 or, alternatively, through the second repeater 128. The latter two messages can be discarded in favor of the directly received message by means of the sequence number field 92 (shown in FIG. 4). Each of the units in the packet radio communication system maintains a set of acceptable sequence numbers which designate which sequence numbers that particular unit will receive. All other messages will be discarded by that unit.

Figure 7A:
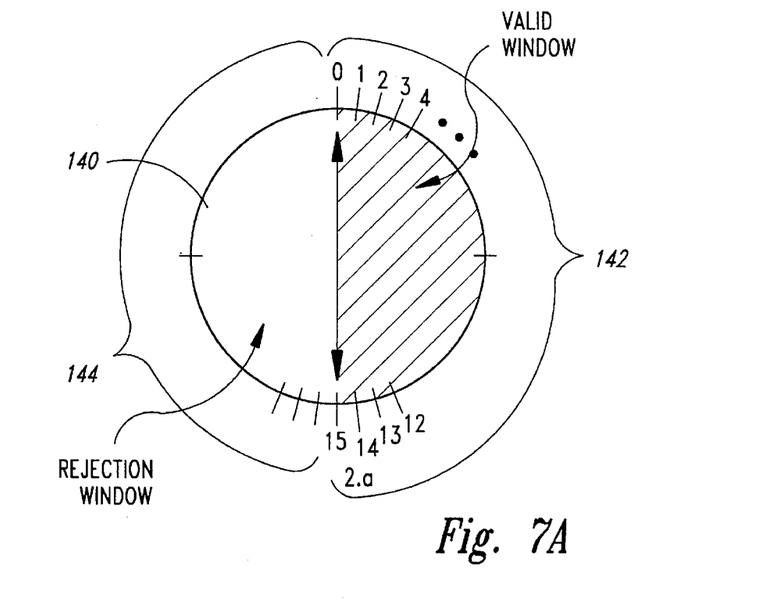
FIG. 7A is a schematic diagram of a rejection window at a unit of the packet radio communication system of the present invention according to the protocol of the present invention, before the transmission of a message.

FIG. 7A is a schematic diagram graphically illustrating a window used with the packet radio communication system of the present invention operating according to the protocol of the present invention, before the transmission of a message. The window has a circle 140 with sequence numbers on the circumference of the circle representing the possible values that can be contained in a set of possible sequence numbers. Preferably, the set of possible sequence numbers constitutes $\{0, \ldots, 2^N-1\}$, for some integer N. For ease of interpretation, the sequence numbers are considered modulo some integer base. If the set of possible sequence numbers constitutes $\{0, \ldots, 2^N-1\}$, the integers are considered modulo $2^N$. Some predetermined fraction of the set of possible sequence numbers constitutes the set of sequence numbers in a "valid" window 142, and the set of remaining possible sequence numbers constitutes the set of sequence numbers in a "rejection" window 144. In the example shown in FIG. 7A, the set of sequence numbers in the "valid" window is $\{0, \ldots, 15\}$ and the set of sequence numbers in the "rejection" window is $\{16, \ldots, 31\}$. A message received by a unit in a packet radio communication system of the present invention will be rejected unless the number stored in the sequence number field 92 is in the "valid" window 142.

Generally speaking, when the packet radio communication system of the present invention begins operation, the "valid" windows 142 for each of the source and destination units are synchronized. For ease of illustration, assume that each of the "valid" windows 142 are $\{0, \ldots, 2^N-1\}$. Each time a unit in the packet radio communication system receives a message, the numbers defining the end points of the valid window 142 are incremented by one. Therefore, if the valid window 142 is $\{0, \ldots, 15\}$, after receiving the next message, the valid window 142 becomes $\{1, \ldots, 16\}$. This is shown as valid window 152 in the circle 150 of FIG. 7B, which is a schematic diagram of the rejection window after the transmission of a message. Consequently, if the valid window 142 is $\{16, \ldots, 31\}$, the next valid window 142 becomes $\{17, \ldots, 31, 0\}$. The next valid window 142 is then $\{18, \ldots, 31, 0, 1\}$, etc.

Figure 7B:
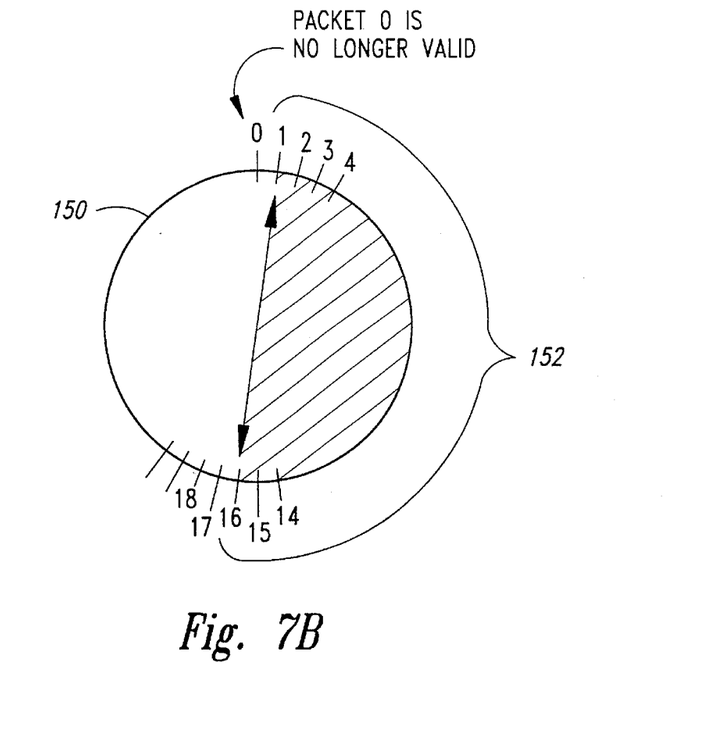
FIG. 7B is a schematic diagram of the rejection window of FIG. 7A after the transmission of a message.

The lower limit (modulo the base number) of the valid window 142 is generally the sequence number of the next expected message. Since the lower limit (modulo the base number) of the valid window 142 is updated each time another message is received, only one copy of a particular message will be accepted by the unit. This is because after the first copy is accepted the lower limit (modulo the base number) of the valid window 142 is incremented by one, and subsequently received copies of the same message will have a sequence number which falls in the rejection window 144.

It is also possible for frames corresponding to messages to be lost in the packet radio communication system of the present invention. This typically happens in one of two ways. One way is for the two messages to "collide," i.e., for them to arrive essentially simultaneously at the destination. This is a situation well-understood and often analyzed in connection with packet radio communication systems. The other way is for a mobile source unit or destination unit to move out of the range of any repeater and each other, or, the repeaters to be too far apart when relaying is required between two repeaters. Either of these situations will break the link between the message source and the message destination. The failure of this link is immediately recognized when the message source does not receive a response ("UA") acknowledging receipt of the transmitted message. In this case, the message is retransmitted for a certain predetermined number of times. The reason is to reestablish the communication link as soon as possible, in case disruption of communications was just the result of an intermittent failure in the link. If the link is not reestablished following retransmitting the message the prescribed number of times, it is presumed that the message source has moved out of range to disrupt the link.

Figure 8A:
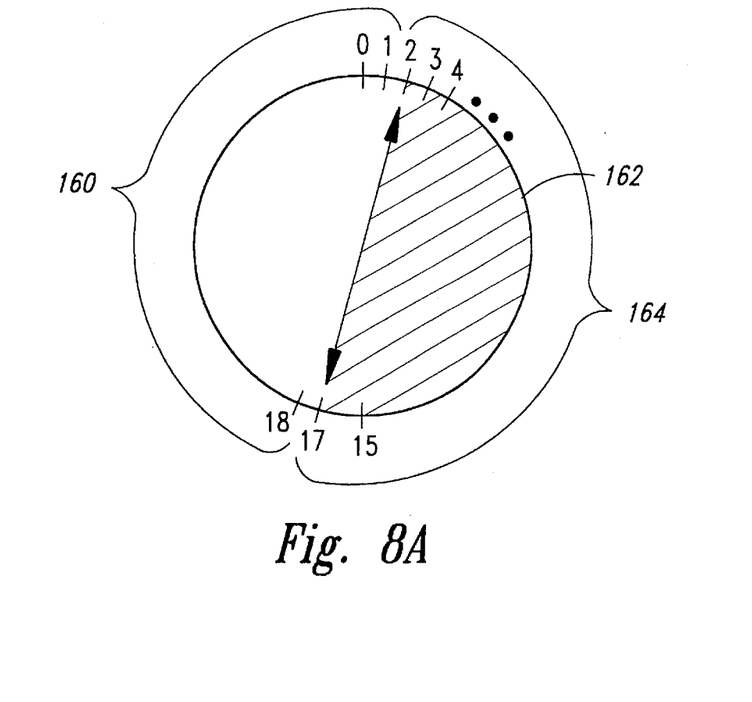
FIG. 8A is a schematic diagram of the rejection window of FIG. 7A before the rejection window is updated in response to the receipt of a "lost" message.
Figure 8B:
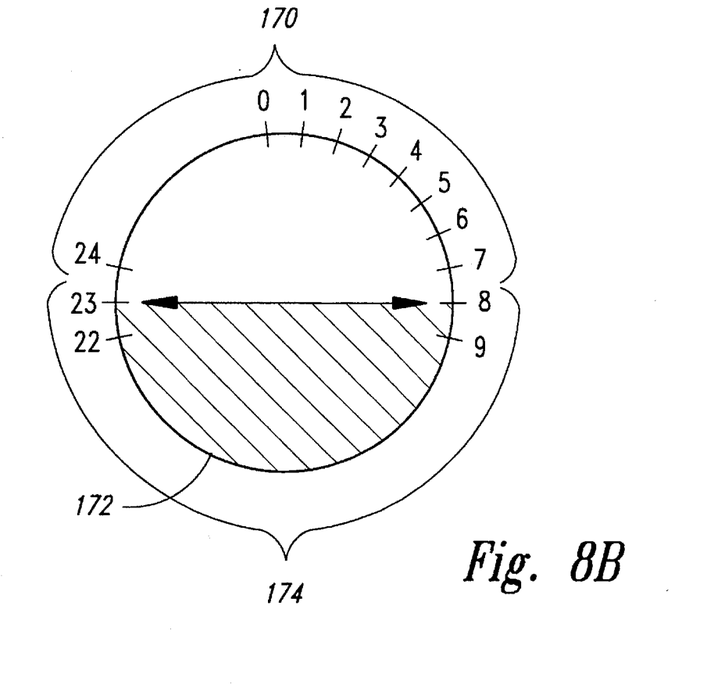
FIG. 8B is a schematic diagram of a rejection window of FIG. 7A after the rejection window is updated in response to the receipt of a "lost" message.

A source unit and a destination unit will allow as many messages as there are in the "valid" window 142 to become lost while still maintaining synchronization. FIGS. 8A and 8B show what happens if five packets are lost. FIG. 8A is a schematic diagram of a rejection window 160 in a circle set of acceptable sequence numbers 162 at a destination unit of the packet radio communication system of the present invention, using the protocol of the present invention, before the rejection window is updated in response to the receipt of a "lost" message. FIG. 8B is a schematic diagram of a rejection window 170 in the circle set of acceptable sequence numbers 172 at the destination unit after the rejection window is updated in response to the receipt of a "lost" message. In FIG. 8A it is assumed that out of 8 packets sent, packets 0 and 1 were successfully received to define the "valid" window 164 and packets 2 through 6 were lost. As a consequence, the "valid" Window 164 did not advance further. Each time a packet was transmitted, the sender unit incremented its sequence count (and the sequence count field 92 of the frame 90). However, because these packets were lost, the destination unit (see FIG. 8A) did not receive them and the receive valid window 164 is still set between 2 and 17. When packet 7 eventually arrives at the destination unit, it falls within the valid window 164 and is accepted by the destination unit. The destination unit then sets its internal sequence count to 8 as shown in FIG. 8B and slides its valid window 164 to the position of valid window 174 shown in FIG. 8B to allow packets 8 through 23.

When more than sixteen packets are lost, all of the sender's packets will fall outside the receiver's valid window. With a valid window of sixteen packets and an invalid window of sixteen packets, the worst case scenario would cause the sending device to transmit sixteen times before falling back into the receiver's window. To minimize the time required for synchronization all devices in fail state will increment the sequence number count by (N/2)−1 where N is equal to the maximum number of unique packets. The currently used 5-bit field in the network packet structure sets N to 32. Therefore the sequence count will be incremented by (32/2)−1=15 when in this state.

The sending device will assume it is in fail state after a user configurable value of maximum attempts to establish communications with the receiver. This value is currently set to three. If, after three attempts, communications is not established, the sender will begin incrementing the sequence count by fifteen until a response is received.

Figure 9:
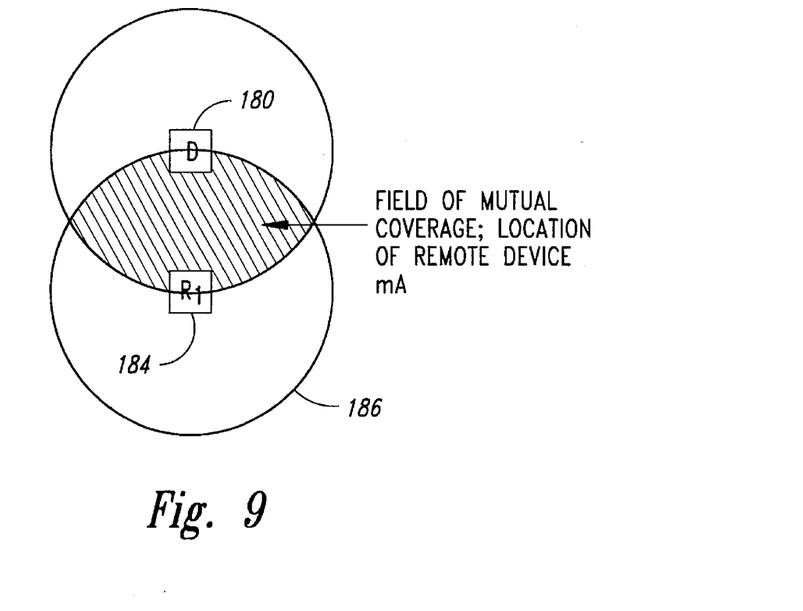
FIG. 9 is a schematic diagram of a configuration of a base and a repeater unit, showing the field of mutual coverage.
Figure 10:
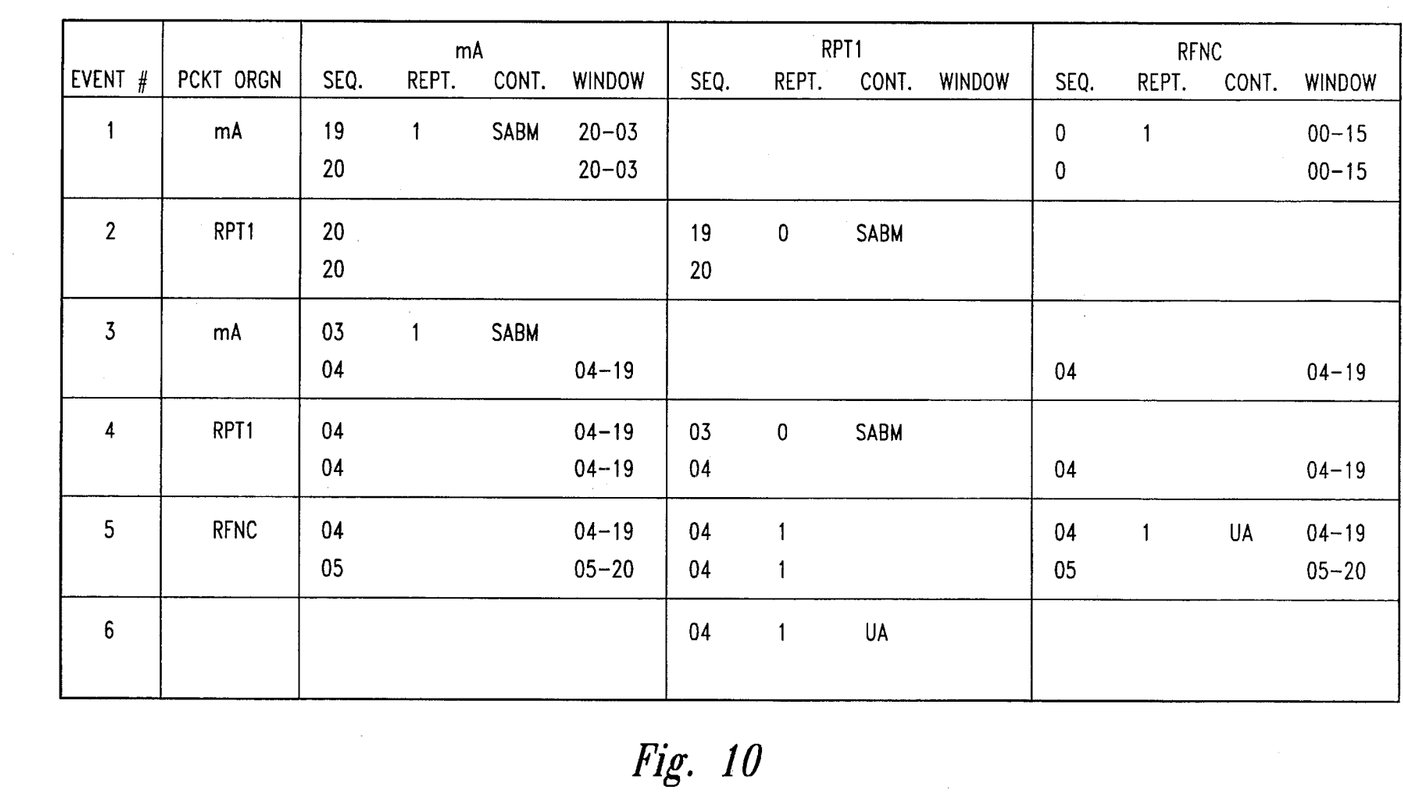
FIG. 10 is a table of the transmitted frames and sequence and repeat counts of the three units shown in FIG. 9.

The following is an example of how a link connection is established between a repeater and the Radio Frequency Network Controller (RFNC) of BRU 180. FIG. 9 is a schematic diagram of a configuration of the BRU 180, having an antenna coverage circle 182, and a repeater 184 with an antenna coverage circle 186. FIG. 10 is a table of the transmitted frames, and sequence and repeat counts of the two units shown in FIG. 9. It is assumed that the mobile source (not shown in FIG. 9) has been out of range of the antenna coverage circles 182 and 186 of the BRU 180 and the repeater 184 for some time. Accordingly, the RFNC (which is now assumed to be in the intersection of the antenna coverage circle 182 and the antenna coverage circle 186) is assumed to be in the "Disconnected State" with respect to the mobile source. The address stored in the destination field 76 of the frame 70 is set to A1, the sequence count in the sequence number field 92 is initialized to zero, and the repeat count in the sequence number field 96 is set to one. It is further assumed that the mobile source comes into range of the BRU 180 in such as way that it is also within range of the repeater 184. The sequence number field 96 of the frame 70 of the repeater 184 is set to 19 (an arbitrary choice) and repeat count in the sequence number field 96 of the repeater 184 is set to one. While in the Fail state, the repeater 184 increments the sequence number field 96 of the frame 70 of the repeater 184 by fifteen (one less than half of the size of the window (see window 140 of FIG. 7A), and will attempt to connect to the RFNC of the BRU 180. The repeater 184 will continue to do this until communication with the RFNC is established.

With reference to FIG. 10, in the first event, the mobile source appears in the field of mutual coverage (i.e., the intersection of the antenna coverage circle 186 of the repeater 184 and the antenna coverage circle 182 of the BRU 180). When in the field of mutual coverage, the mobile source attempts to transmit an SABM command to the RFNC of the BRU 180. The packet is transmitted with a sequence count of 19. The internal sequence count variable for the mobile source is then incremented to 20. The receive window for the mobile source is now 20 through 03 (modulo 32). The packet sent by the mobile source in the first event falls outside the window of the RFNC ({0, . . . , 15}), and is rejected.

In the second event, the repeater 184 decrements the repeat count and forwards the packet received from the mobile source in the second event. The packet falls outside the valid window ({0, . . . , 15}) of the RFNC and is rejected.

In the third event, the mobile unit times out in the Fail state and increments the sequence count by 15 ($=2^{N-1}-1$). The mobile unit then retransmits the SABM command packet with sequence count 03. The mobile unit then sets its internal sequence count variable to four. The receive window in the mobile unit is now 04 through 19. The RFNC receives the packet sent by the mobile unit in the third event. The sequence number of the packet falls inside the valid window of the RFNC, and is accepted. The internal sequence count variable in the RFNC is set to four. The valid window of the RFNC is therefore slid to 04–19. Synchronization of the sequence count between the mobile unit and RFNC of the BRU 180 has now been established.

In the fourth event, the repeater 184 forwards the packet (which was sent in the third event by the mobile unit) to the RFNC. The packet falls outside the RFNC valid window of 04–19, and is rejected.

In the fifth event, the RFNC acknowledges the SABM command sent by the mobile unit with a UA response. The RFNC sends the UA with a sequence count of four and increments its internal count to five. The RFNC valid receive window is now 05–20. The mobile unit receives the UA which falls inside the valid window of 04–19. The internal sequence count variable for the mobile unit is set to five, thus sliding the receive window of the mobile unit to 05–20. The mobile unit and the RFNC of the BRU 180 are now said to be "connected."

In the sixth event, the repeater 184 decrements the repeat count and forwards the packet to the RFNC. The packet is rejected by the mobile unit because its sequence number falls outside the valid window of the mobile unit.

Figure 11:
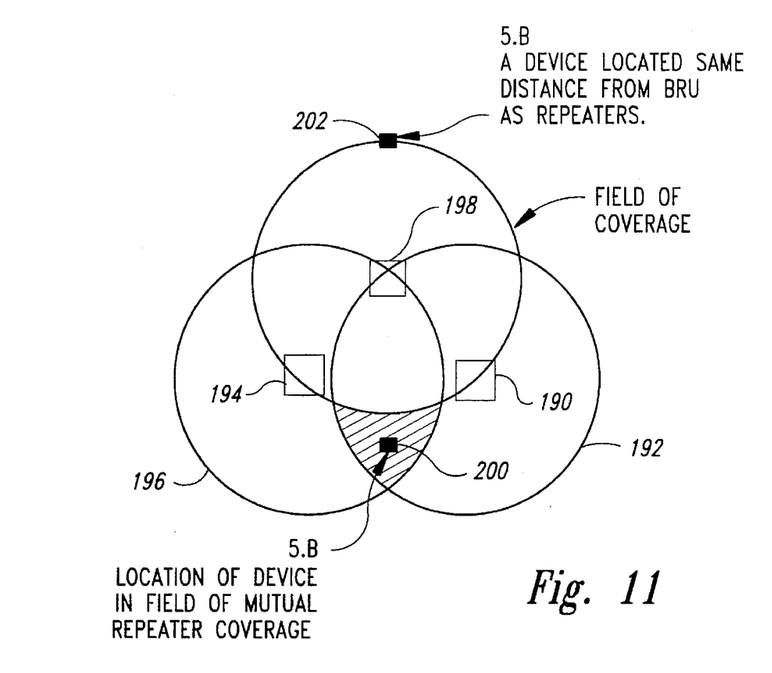
FIG. 11 is a schematic diagram of a configuration of a base, two sources and two repeater units, illustrating the location of one source which results in mutual repeater coverage, and the location of a second source which is located the same distance from the destination as the repeaters.

FIG. 11 is a schematic diagram of a configuration of a base unit BRU 198 and two repeaters 190 and 194, illustrating the location of a mobile 200 source which results in mutual repeater coverage. When two or more repeaters are within range of the BRU 198 and have a field of mutual coverage, as shown in FIG. 11, a method of network access contention resolution is needed. From FIG. 11 it can be seen that both the repeater 190 having the antenna coverage circle 192 and the repeater 194 having the antenna coverage circle 196 will receive any packets transmitted from the BRU 198. If the two repeaters 190 and 194 both transmit the packet at the same time, the two packets will collide and be destroyed. Empirical results show that when repeater power differences are less than 3 dB, the mobile source 200 will have difficulty receiving the signal from either repeater. This produces a zone shown as the cross-hatched area in FIG. 11 of no coverage (based on a simple model where multipath and other radio wave propagation properties are neglected).

This problem is handled by allowing the mobile unit 200 to wait 25 milliseconds before responding to the BRU 198. In this way the mobile unit 200 does not respond until the repeaters have completed their transmissions.

Also in FIG. 11, another problem exists. In this case, a mobile unit 202 is located the same distance from the BRU 198 as the BRU is located from each of the repeaters 190 and 194. The mobile unit 202 gets the packet from the BRU 198. When the mobile unit responds with an acknowledge ("UA") reply, the packet containing the acknowledge is destroyed when the repeaters both simultaneously forward the same reply to the BRU 198.

In order to avoid this problem with mobile unit 202, the repeaters 190 and 194 are required to perform carrier sensing with a random back-off time. When a packet is received, each repeater will wait a random period of time from between one and seven milliseconds. It will then check to see if no other carriers are present. If not, the packet is forwarded. Otherwise, the back-off procedure is repeated.

Figure 12:
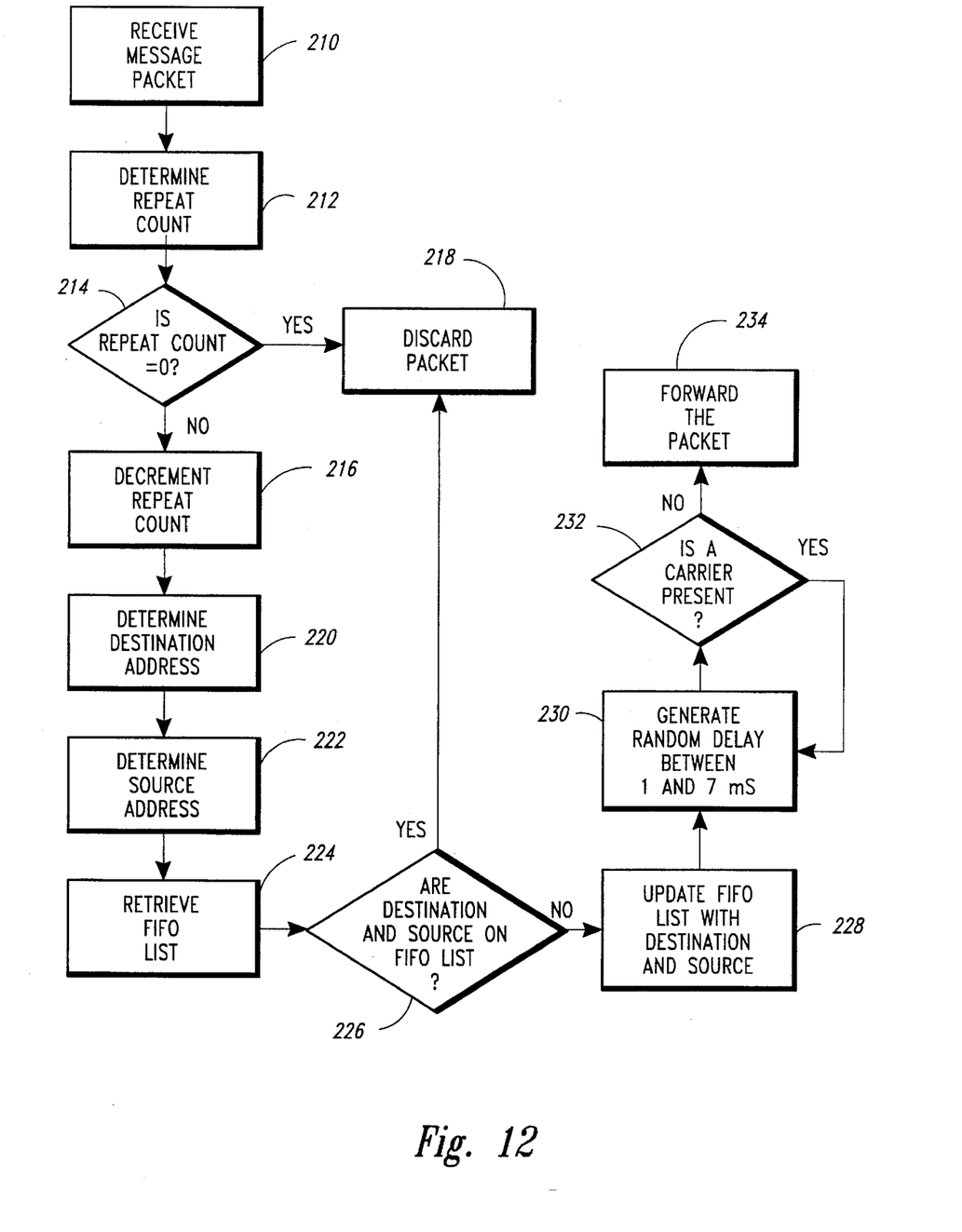
FIG. 12 is a flow chart of an algorithm which may be used to discard repeated packets.

A flow chart of an algorithm which may be used to discard repeated packets is shown in FIG. 12. In this algorithm the first step (block 210) receives the message packet. Then the repeat count is determined from the frame of the message packet (block 212). The repeat count is then checked against zero decision block 214. If the repeat count is not equal to zero, it is decremented by one (block 216); otherwise, the packet is discarded (block 218). After decrementing the repeat count in the block 216, the destination and source addresses are determined from the frame of the packet (blocks 220 and 222, respectively). Finally, the first in-first out (FIFO) list (presently comprising the last five destination and source addresses from packets that have been retransmitted) is retrieved (block 224). In the decision block 226, the destination and source addresses (from the frame of the packet that is being tested) are checked against the FIFO list. If the destination and source addresses are not on the FIFO list, the FIFO list is updated by deleting the oldest entry from the bottom of the FIFO list and inserting the destination and source addresses from the present packet on the top of the FIFO list (block 228); otherwise, the packet is discarded (block 218). After the FIFO list is updated, the device attempts to transmit the message packet. It first generates a random delay between one and seven milliseconds (block 230), and then causes the transmitter/receiver to check for the presence of a carrier signal (block 232). If there is a carrier present, the program returns to block 230; otherwise, it forwards the packet by transmitting it (block 234).

Figure 13:
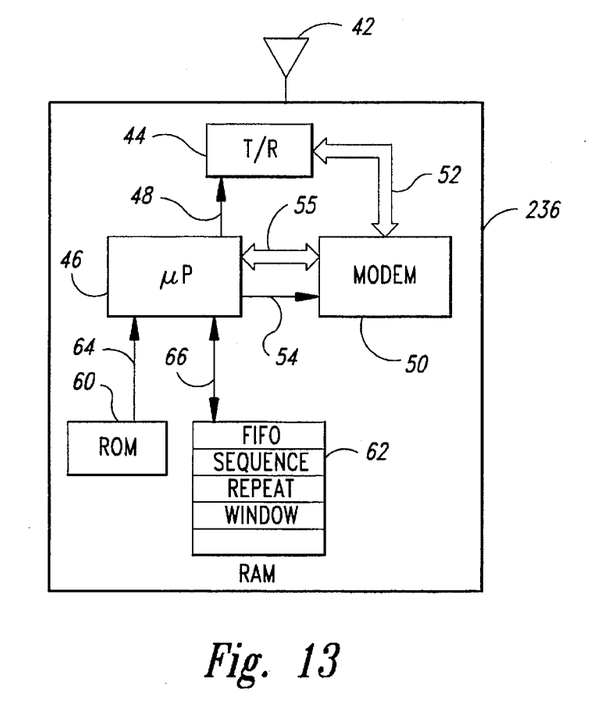
FIG. 13 is a schematic block diagram of a packet radio transmitter/receiver.

FIG. 13 is a schematic block diagram of a packet radio transmitter/receiver 236 according to the present invention. The packet radio transmitter/receiver 236 has the same components as the packet radio transmitter/receiver unit 40 (shown in FIG. 2), except that more structure is applied to the RAM 62. In the packet radio transmitter/receiver 236, the RAM 62 is specifically structured to store the FIFO list, the sequence count, the repeat count, and the window of valid sequence numbers.

Figure 14:
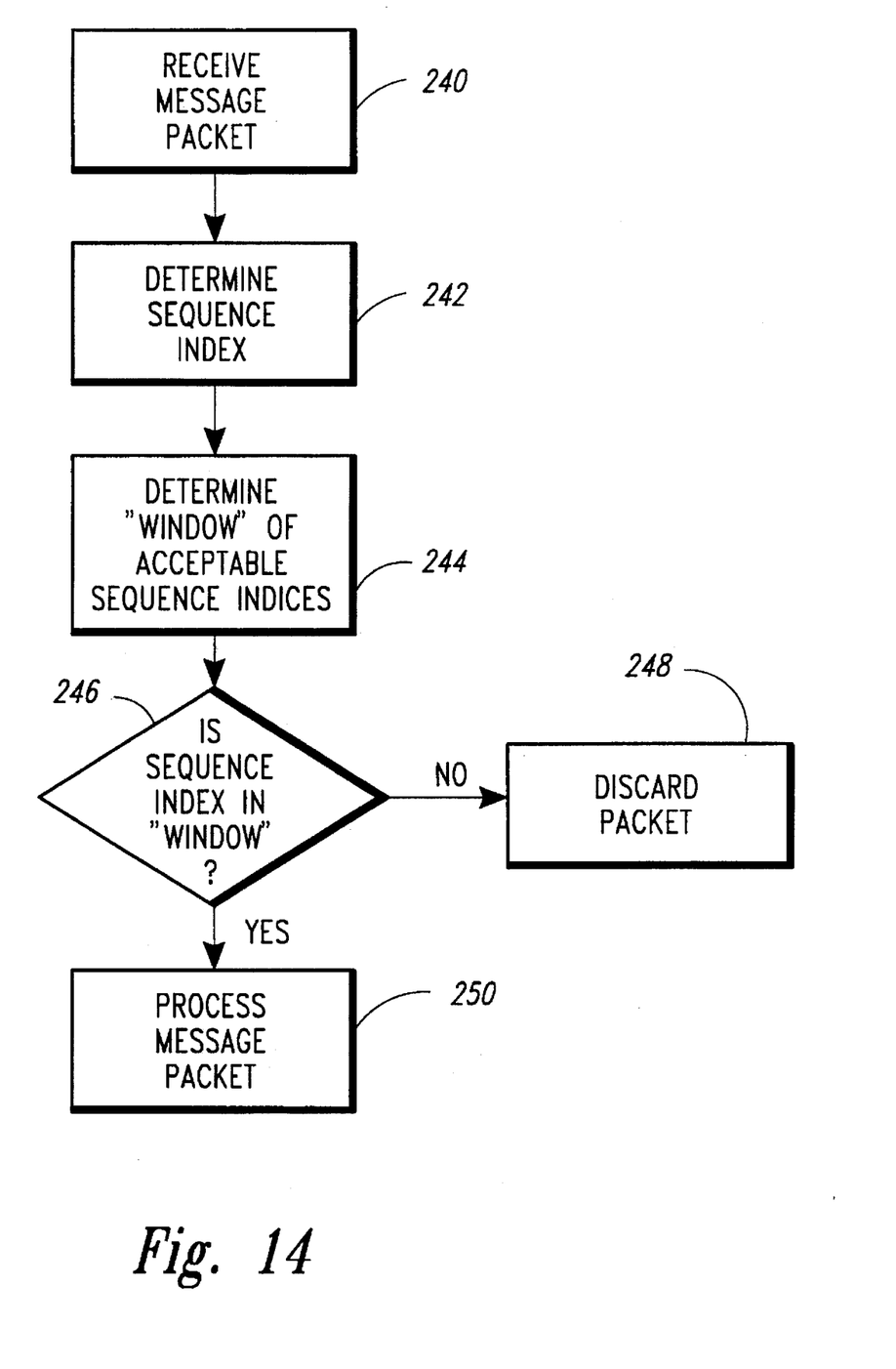
FIG. 14 is a flow chart of an algorithm which may be used to discard lost packets.

FIG. 14 is a flow chart of an algorithm which may be used to discard lost packets. The algorithm can be used by the microprocessor 46 of the unit that is to test the packet. After receiving a message packet which is to be tested (block 240), the sequence index is determined from the packet frame (block 242). Next, the window of valid sequence indices is determined from the RAM 62 of the packet radio transmitter/receiver 236 (block 244). The sequence index is tested against the window of valid sequence indices (block 246). The packet is discarded if its sequence index does not fall within the valid window of the test unit (block 248) and the message packet is further processed for possible retransmission otherwise (block 250).

As indicated above, detailed illustrative embodiments are disclosed herein. However, other embodiments, which may be detailed rather differently from the disclosed embodiments, are possible. Consequently, the specific structural and functional details disclosed herein are merely representative: yet in that regard, they are deemed to afford the best embodiments for the purposes of disclosure and to provide a basis for the claims herein, which define the scope of the present invention.

We claim:

1. In a data collection environment, a method for controlling a packet communication system including a source station, a destination station and one or more repeater stations adapted to repeat messages from the source station to the destination station comprising the steps of:
   at the source station:
   (a) composing a plurality of discrete frames that together represent a portion of the message, each frame including:
      (1) an address code of the destination station,
      (2) an address code of the source station, and
      (3) a single sequence index indicating the sequence, relative to other frames produced by the source station, in which the frame was composed at the source station;
   (b) transmitting the frames; and at the destination station:
   (c) receiving the frames;
   (d) reading the sequence index from each received frame;
   (e) computing a window of acceptable frame sequence indices at the destination station based upon a previous sequence index for a frame previously received, the previous sequence index being indicative of the frames expected to be received subsequent to the frame previously received, the window including a set of frame sequence indices smaller than a set of all possible frame indices;
   (f) comparing the sequence index of the received frame with the frame sequence indices in the set of acceptable frame sequence indices;
   (g) processing the received frame if it has a sequence index that matches one of the frame sequence indices in the window of acceptable frame sequence indices;
   (h) for each frame received, updating the previous sequence index based upon the sequence index of the received frame, if the sequence index of the received frame matches one of the frame sequence indices in the window of acceptable message sequence indices; and
   (i) discarding the received frame if the sequence index of the received frame is not one of the frame sequence indices in the window of acceptable frame sequence indices.

2. The method of claim 1 further comprising the step of:
   (j) if the sequence index number does not match one of the sequence indices in the set of acceptable indices, resynchronizing the system based upon the window at the destination station.

3. The method of claim 2 wherein the step of resynchronizing the system comprises the steps of:
   indicating to the source station that the system is in a fail state;
   determining a revised sequence index based upon the window at the destination station; and
   repeating steps (c)–(g) for a frame corresponding to the revised sequence index.

4. The method of claim 3 wherein the step of determining a revised sequence index comprises incrementing the sequence index by a number differing from (N/2) by an odd integer where N is a maximum number of packets which can be uniquely identified for a field length corresponding to the sequence index in the frame.

5. The method of claim 4 wherein the odd integer is 1.

6. A method for controlling a packet communication system including a source station, one or more repeater stations and a destination station, each of the source and destination stations having a unique address code, the packet communication system being adapted to transmit messages from the source station to the destination station in the form of discrete frames, the method comprising the steps of:
   at the source station:
   (a) composing a plurality of discrete frames representing a portion of message, each frame including:
      (1) the address code of the destination station,
      (2) the address code of the source station, and
      (3) a repeat count representative of a predetermined number of times the frame is to be repeated by the packet communication system, and
      (4) a single sequence index indicating the sequence relative to other frames produced by the source station in which the frame was composed at the source station; and
   (b) transmitting the frame:
   at each repeater station;
   (c) receiving the transmitted frame;
   (d) comparing the repeat count to a predetermined range of values;
   (e) retrieving a list of attributes from a memory at the repeater station, the list of attributes including attributes from each of a predetermined number L of previous frames transmitted by the repeater station;
   (f) comparing attributes of the received frame to the attributes in the list of attributes, with a match being indicative that the received frame is among the L previous messages transmitted by the repeater station;
   (g) transmitting the received frame only if the comparison of step (f) indicates that the received frame is not among the L previous frames transmitted by the repeater station and the repeat count is within the predetermined range of values; and (h) when the received frame is transmitted by the repeater station, updating the list of attributes from the L previous frames by removing from the list the attributes of the frame that was received the greatest time in the past and adding the attributes from the received frame transmitted by the repeater station.

7. A method for controlling a packet communication system including a terminal station, the packet communication system being adapted to transmit messages from a source station in the form of discrete frames, each transmitted frame having a single sequence index indicative of the transmission sequence of the transmitted frame relative to other messages transmitted by the source station, and wherein a plurality of frames form a portion of the message, the method comprising the steps of:

at the terminal station:

(a) receiving the transmitted frame;

(b) reading from each received frame a sequence index indicative of the transmission sequence of the transmitted frame relative to other frames transmitted by the source station;

(c) retrieving from a memory in the terminal station a stored indicator indicative of the frames previously received by the terminal station;

(d) computing maximum and minimum acceptable frame sequence indices from the indicator retrieved from the memory;

(e) comparing the sequence index from the received frame with the maximum and minimum acceptable frame sequence indices;

(f) processing the received frame if its sequence index is between the maximum and minimum acceptable frame sequence indices; and (g) for each sequence index of the received frame between the maximum and minimum acceptable frame sequence indices, updating the indicator in the memory in the terminal station with a new indicator indicative of the sequence of frame previously received, including the received message.

8. The method of claim 7 further comprising the step of:

(h) if the sequence index number does not match one of the frame sequence indices in the sat of acceptable indices, resynchronizing the system based upon the window at the terminal station.

9. The method of claim 8 wherein the step of resynchronizing the system comprises the steps of:

indicating to the source station that the system is in a fail state;

determining a revised sequence index based upon the station; and repeating steps (a)–(h) for a frame corresponding to the revised sequence index.

10. The method of claim 9 wherein the step of determining a revised sequence index comprises incrementing the sequence index by a number differing from (N/2) by an odd integer where N is a maximum number of packets which can be uniquely identified for a field length corresponding to the sequence index in the frame.

11. The method of claim 10 wherein the odd integer is 1.

12. Apparatus for controlling a packet communication system including a source station, a destination station, and one or more repeater stations each station having a unique address code, the packet communication system being adapted to transmit messages from the source station to the destination station in the form of discrete frames, comprising:

at the source station:

electronic circuitry for composing a frame, the frame including:

(1) the address code of the destination station, (2) the address code of the source station, (3) a repeat count representative of a desired number of times the message is to be repeated by the system, (4) a sequence index indicating the sequence in which the message was composed at the source station, and (5) a portion of a message; and at each repeater station:

electronic circuitry for receiving the frame;

a comparator comparing the repeat count of the received frame with a predetermined range of values to determine whether the frame should be repeated or discarded; and a transmitter including a generator capable of generating a random time delay, the transmitter being responsive to transmit the frame only if the comparator determines that the repeat count is within the predetermined range of values;

electronic circuitry for retrieving from a memory at the repeater station a list of attributes, the list of attributes identifying each of a predetermined number, L, of messages previously transmitted by the repeater station;

a second comparator comparing each of the attributes in the list of attributes with corresponding attributes of the received message to determine whether the received message is one of the L messages transmitted previously by the repeater station;

electronic circuitry updating the list of attributes from the L previous messages by removing from the list of attributes the attributes from the messages that were received the greatest time in the past and adding to the list of attributes the attributes from the transmitted message; and wherein the transmitter is responsive to transmit the received frame only if the second comparator determines that the received frame is not one of the L frames transmitted previously by the repeater station.

13. The apparatus of claim 12, wherein the second comparator is operable to discard the received message if its sequence index does not match one of the sequence indices in the set of acceptable message sequence indices.

* * * * *